(12) United States Patent
Zhu

(10) Patent No.: US 11,874,472 B1
(45) Date of Patent: Jan. 16, 2024

(54) ADJUSTABLE HEADBAND FOR VIRTUAL REALITY GLASSES AND VIRTUAL REALITY GLASSES

(71) Applicant: SHENZHEN WEIMEITE TECHNOLOGY CO., LTD., Shenzhen (CN)

(72) Inventor: Lingsheng Zhu, Shenzhen (CN)

(73) Assignee: SHENZHEN WEIMEITE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/088,888

(22) Filed: Dec. 27, 2022

(51) Int. Cl.
  *G02B 23/00* (2006.01)
  *G02B 27/01* (2006.01)
  *F16H 19/04* (2006.01)

(52) U.S. Cl.
  CPC ......... *G02B 27/0176* (2013.01); *F16H 19/04* (2013.01); *G02B 23/00* (2013.01); *G02B 2027/0178* (2013.01)

(58) Field of Classification Search
  CPC . G02B 7/00; G02B 7/002; G02B 7/02; G02B 7/022; G02B 7/023; G02B 7/026; G02B 7/22; G02B 23/00; G02B 23/14; G02B 23/16; G02B 23/18; G02B 25/00; G02B 25/002; G02B 25/004; G02B 27/00; G02B 27/017; G02B 27/0176; G02B 27/02; G02B 27/022; G02B 27/028; G02B 2027/0132; G02B 2027/0134; G02B 2027/0149; G02B 2027/015; G02B 2027/0152; G02B 2027/0178
  USPC ................. 359/404–409, 477, 600, 808–811
  See application file for complete search history.

(56) References Cited

U.S. PATENT DOCUMENTS

| 2019/0196536 A1* | 6/2019 | Wang ...................... G06F 3/011 |
| 2022/0121033 A1* | 4/2022 | Cai ......................... F16M 13/04 |

FOREIGN PATENT DOCUMENTS

| CN | 211426934 | * | 9/2020 |
| CN | 212905719 | * | 4/2021 |

* cited by examiner

*Primary Examiner* — Thong Q Nguyen
(74) *Attorney, Agent, or Firm* — Daniel M. Cohn; Howard M. Cohn

(57) ABSTRACT

An adjustable headband for virtual reality glasses and virtual reality glasses are provided. The virtual reality glasses include a glasses body, a fixing headband and an adjustable headband. The adjustable headband includes a housing, a telescoping band, a drive portion, and a control portion. The drive portion includes a first transmission component, a first elastic component and a second transmission component. The control portion is configured to drive the first transmission component. The first transmission portion is configured to drive the second transmission component. The second transmission portion is configured to drive the telescoping band. The first elastic component is configured to control a drive connection between the first transmission component and the control portion.

13 Claims, 8 Drawing Sheets

ADJUSTABLE HEADBAND FOR VIRTUAL REALITY GLASSES AND VIRTUAL REALITY GLASSES

TECHNICAL FIELD

The present disclosure relates to a technical field of virtual reality devices, in particular to an adjustable headband for virtual reality glasses and virtual reality glasses.

BACKGROUND

Virtual reality (VR) glasses are a VR headset, which uses a head-mounted display device to cover eyes of users for an immersive feel of a virtual world. The display principle is that left and right eye screens present different images separately to left and right eyes, and a human brain creates a stereoscopic vision from information with the difference obtained through human eyes.

An adjustable headband for conventional VR glasses is typically fixed using an adjustable telescoping band. By turning an adjusting knob counterclockwise or clockwise, a length of the telescoping band is changed to adapt to different head shapes of the users. However, frequently tightening or loosening such two-way adjusting knob may easily cause an internal structure of the adjustable headband to collapse, which results in an inability to lock, thereby making it inconvenient to use.

SUMMARY

In view of the foregoing problems in the related art that frequent tightening or loosening may easily cause an internal clamping structure of an adjustable headband to collapse and thereby resulting in inability to lock, the present disclosure provides an adjustable headband that can be locked in position after frequent use and easily to remove.

The present disclosure provides an adjustable headband for VR glasses, including a housing, a telescoping band, a drive portion, and a control portion.

The housing is configured to fix and support the telescoping band, the drive portion and the control portion.

The telescoping band is configured to tighten the VR glasses to a head portion of a user.

The drive portion is configured to adjust a telescoping length of the telescoping band.

The control portion is configured to control the drive portion to operate.

The drive portion includes a first transmission component, a first elastic component, and a second transmission component. The control portion is configured to drive the first transmission component. The first transmission component is configured to drive the second transmission component. The second transmission component is configured to drive the telescoping band. The first elastic portion is configured to control a drive connection between the first transmission component and the control portion.

Furthermore, the first transmission component includes a transmission ring, and a first transmission gear. The transmission ring and the first transmission gear are first coupling gears. The second transmission component includes a second transmission gear and a running gear. The second transmission gear and the running gear are second coupling gears. The first transmission gear is meshed with the control portion. The transmission ring is meshed with the second transmission gear. The running gear is meshed with the telescoping band.

Furthermore, the control portion includes a pressing component and a rotating component. The pressing component is configured to control a connection state between the first transmission gear and the control portion. The rotating component is configured to drive the first transmission gear to rotate.

Furthermore, the pressing component includes a pressing body, a plurality of snap-fit hooks, and a second elastic component. The plurality of snap-fit hooks are configured to guarantee that the pressing body is not detached from the control portion. The second elastic component is disposed below the pressing body, and the second elastic component is compressed with a pressing operation of the pressing body, so that the pressing component acts on the first transmission component and the first elastic component, to allow the first transmission gear to detach from the control portion.

Furthermore, the rotating component includes a rotating body, an internal gear, a ratchet wheel, and a pawl ring. The rotating body is configured to drive the internal gear and the ratchet wheel to rotate. The internal gear is meshed with the first transmission gear. The pawl ring is fixed on the housing. The ratchet wheel is meshed with the pawl ring, to allow the rotating body to rotate in a single direction.

Furthermore, a non-slip thread is disposed on an outer side wall of the rotating body.

Furthermore, the housing includes a first housing, and a second housing. A pair of position-limiting buckles are disposed on the first housing, and the pair of position-limiting buckles are configured to fix the telescoping band.

Furthermore, the telescoping band includes a first telescoping band, and a second telescoping band. The first telescoping band and the second telescoping band are identical in size and shape.

Furthermore, gear racks are disposed on the first telescoping band and the second telescoping band. The gear racks are configured to mesh with the running gear, and the running gear rotates to drive the gear racks to move, so as to allow the first telescoping band and the second telescoping band to extend and retract.

The present disclosure further provides VR glasses, including a glasses body, a fixing headband, and the adjustable headband according to any one of the foregoing embodiments. Two ends of the adjustable headband are connected to the glasses body, and two ends of the fixing headband are respectively connected to a housing of the adjustable headband and the glasses body.

The present disclosure has the following beneficial effects:

(1) According to the embodiments of the present disclosure, two different operational modes are realized using the drive portion. When the first elastic component is in an original state, the control portion is in the drive connection with the first transmission component, and the control portion controls the telescoping band by driving the drive portion. When the first elastic component is in a compressed state, the control portion is not in the drive connection with the first transmission component. Accordingly, the drive portion is out of the control, and the telescoping band can extend and retract freely.

(2) According to the embodiments of the present disclosure, the control portion includes the pressing component and the rotating component. The pressing component is configured to control the two modes of the embodiments of the present disclosure. The rotating component is configured to, when the control portion drives the telescoping band, control a telescoping degree of the telescoping band when the control portion drives the telescoping band, thereby realizing flexible control of the telescoping band.

(3) According to the embodiments of the present disclosure, the ratchet wheel and the pawl ring in the rotating component are meshed with each other, which allows the rotating body to rotate only in one direction. Thus, the telescoping band according to the embodiments of the present disclosure can maintain an adjusted tightness.

BRIEF DESCRIPTION OF THE DRAWINGS

In order to more clearly illustrate the technical solutions of the embodiments of the present disclosure, the drawings used in the embodiments are briefly described below. It will be appreciated that these drawings merely show some embodiments of the present disclosure, and should not be regarded as a limitation of the scope. Those skilled in the art can obtain other related drawings from these drawings without any creative thinking.

DETAILED DESCRIPTION OF THE EMBODIMENTS

The technical solutions in the embodiments of the present disclosure will be clearly and completely described below with reference to the accompanying drawings. The described embodiments are merely a part of embodiments of the present disclosure, not all of them. Based on the embodiments of the present disclosure, all other embodiments obtained by those skilled in the art without any creative thinking belong to the scope of protection of the present disclosure.

Figure 1:
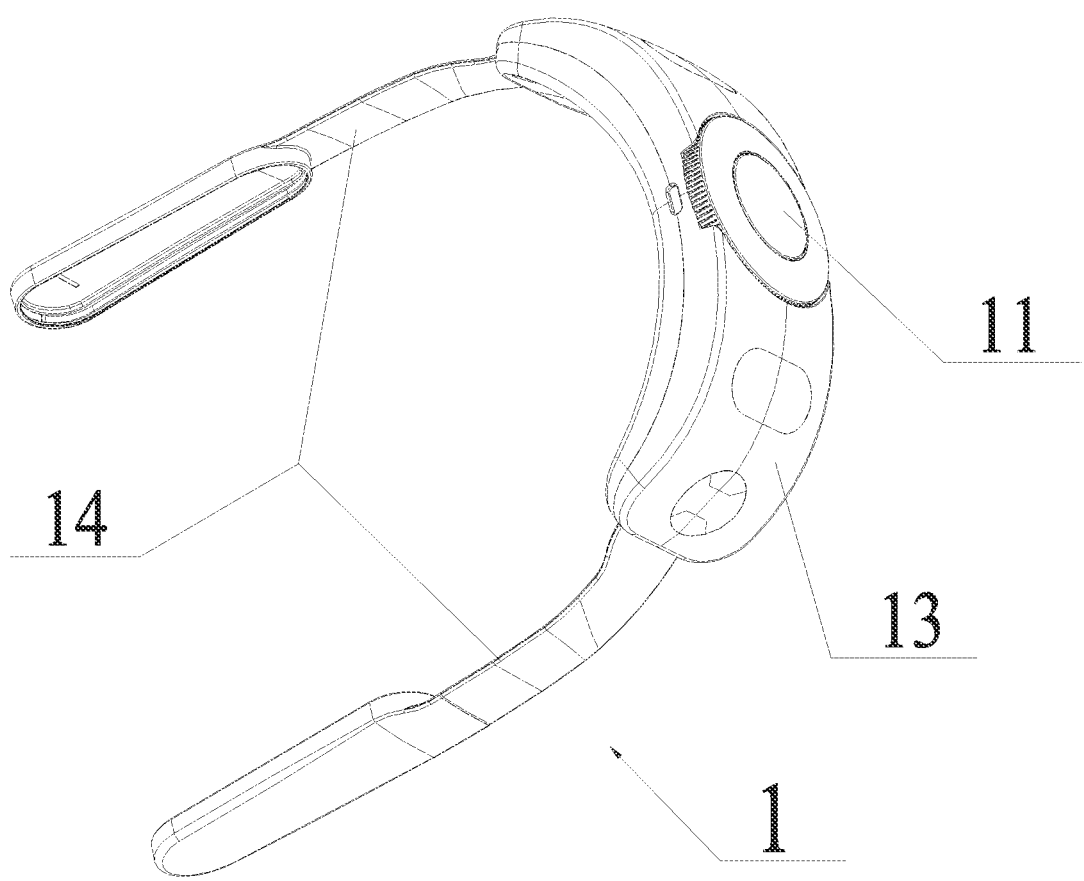
FIG. 1 is a structural schematic diagram of an adjustable headband for VR glasses according to the present disclosure.
Figure 2:
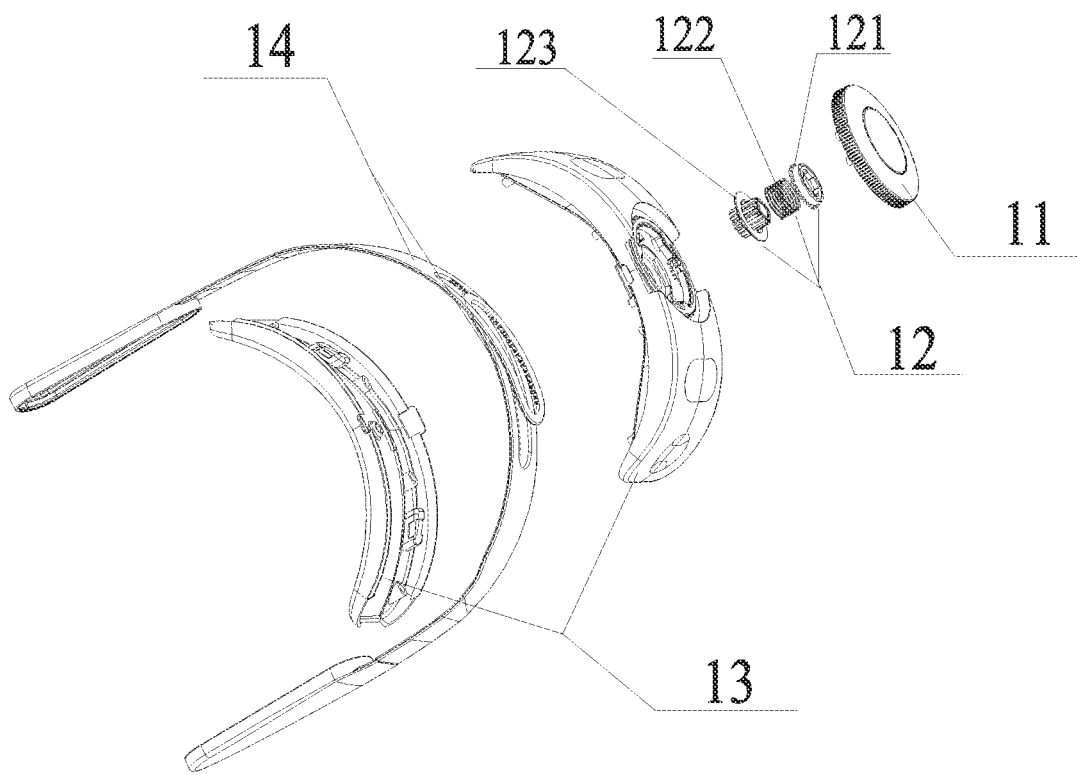
FIG. 2 is an exploded structural schematic diagram of the adjustable headband for VR glasses according to the present disclosure.

Referring to FIG. 1, an embodiment of the present disclosure provides an adjustable headband 1 for VR glasses. Referring to FIG. 2, the adjustable headband 1 includes a control portion 11, a drive portion 12, a housing 13 and a telescoping band 14. The housing 13 is configured to fix and support the telescoping band 14, the drive portion 12 and the control portion 11. The telescoping band 14 is configured to tighten the VR glasses to a head portion of a user. The drive portion 12 is configured to adjust a telescoping degree of the telescoping band 14. The control portion 11 is configured to control the drive portion 12 to operate.

Figure 3:
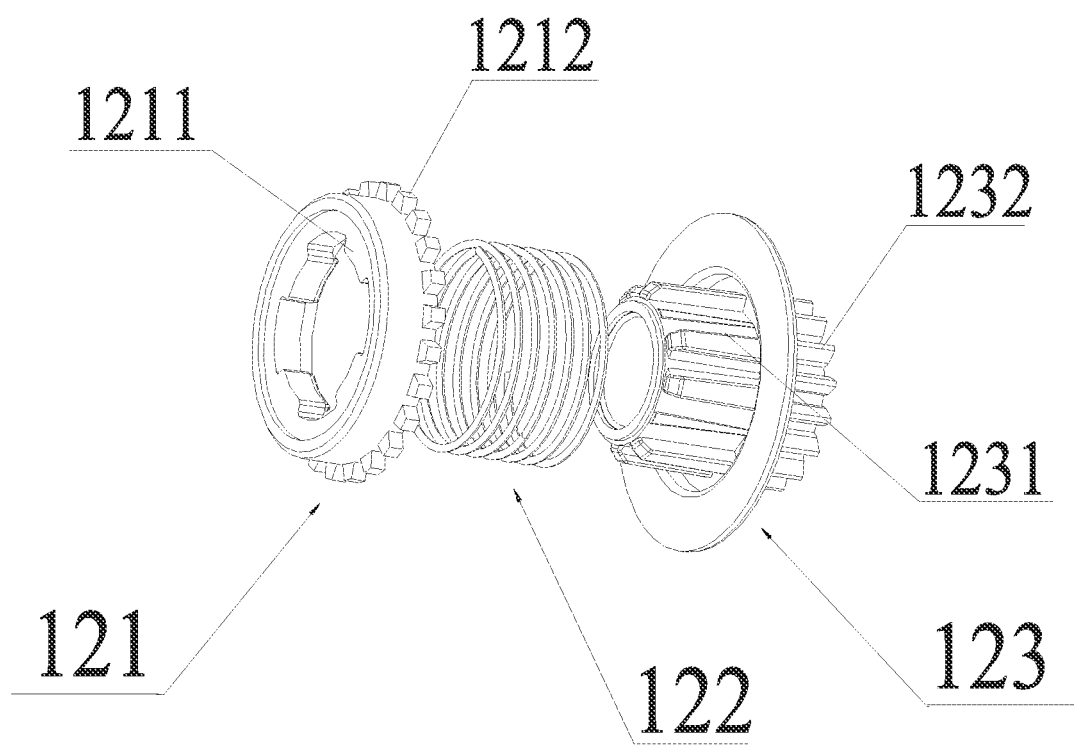
FIG. 3 is a structural schematic diagram of a drive portion in FIG. 2.

The drive portion 12 includes a first transmission component 121, a first elastic component 122, and a second transmission component 123. The control portion 11 is configured to drive the first transmission component 121. The first transmission component 121 is configured to drive the second transmission component 123. The second transmission component 123 is configured to drive the telescoping band 14. The first elastic component 122 may be a spring. The first elastic component 122 is disposed between the first transmission component 121 and the second transmission component 123, and is configured to control a drive connection between the first transmission component 121 and the control portion 11. Referring to FIG. 3, the first transmission component 121 includes a transmission ring 1211 and a first transmission gear 1212. The transmission ring 1211 and the first transmission gear 1212 are first coupling gears. The second transmission component 123 includes a second transmission gear 1231 and a running gear 1232. The second transmission gear 1231 and the running gear 1232 are second coupling gears. The transmission ring 1211 is meshed with the second transmission gear 1231. When the first transmission component 121 is rotated, the second transmission component 123 is rotated. The first transmission gear 1212 is meshed with the control portion 11. The first transmission gear 1212 is driven by the control portion 11. The running gear 1232 is meshed with the telescoping band 14, and the telescoping band 14 is driven by the running gear 1232. When the first elastic component 122 is in an original state, the first transmission gear 1212 is meshed with the control portion 11, and the first transmission gear 1212 is driven by the control portion 11. The control portion 11 controls a telescoping length of the telescoping band 14 by controlling the first transmission gear 1212. When the first elastic component 122 is in a compressed state, the first transmission gear 1212 is detached from the control portion 11, and the telescoping band 14 freely extends and retracts under the action of the drive portion 12.

Figure 4:
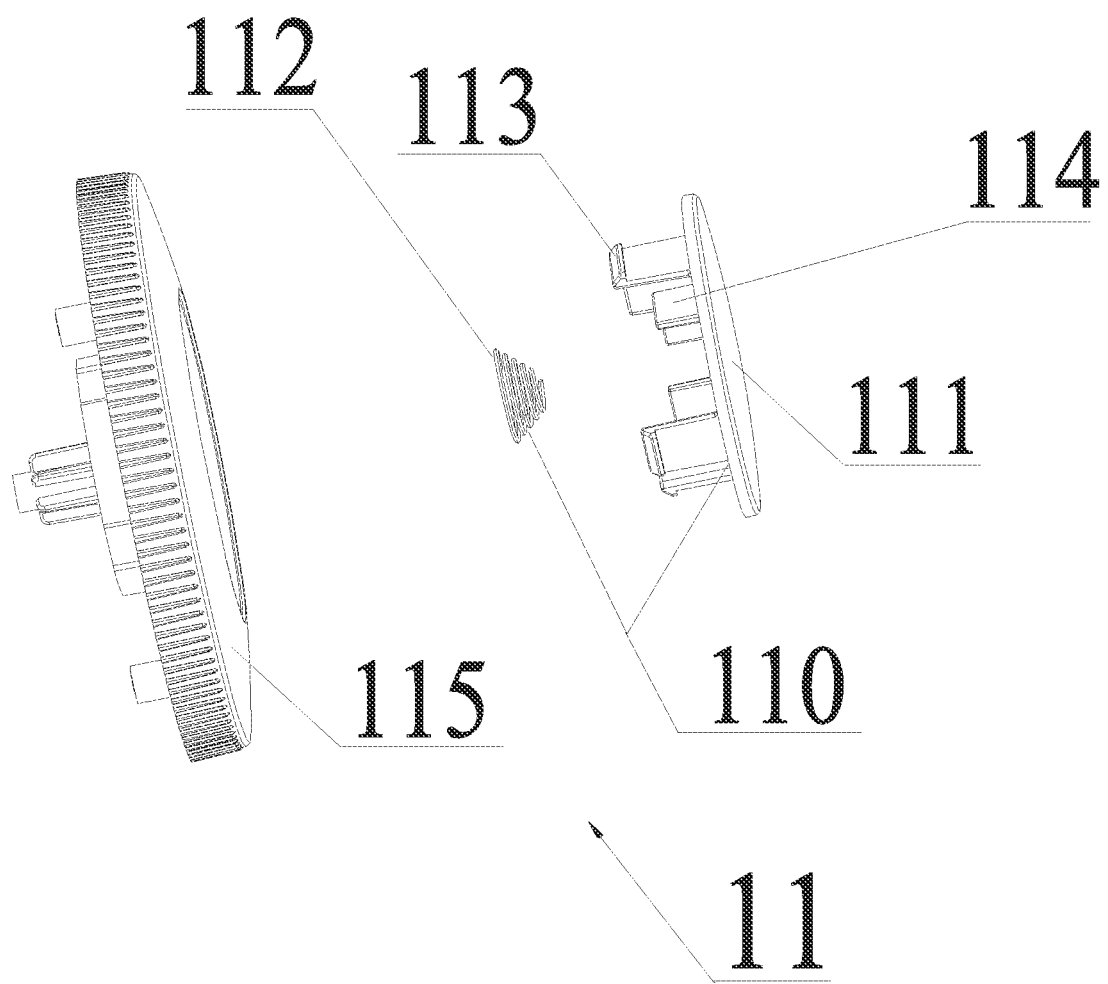
FIG. 4 is an exploded schematic diagram of a control portion in FIG. 2.

Referring to FIG. 4, the control portion 11 includes a pressing component 110 and a rotating component 115. The pressing component 110 is configured to control a state of the first elastic component 122. The rotating component 115 is configured to drive the first transmission gear 121 to rotate. The pressing component 110 includes a pressing body 111, a plurality of snap-fit hooks 113, and a second elastic component 112. The snap-fit hooks 113 are configured to guarantee that the pressing body 111 is not detached from the control portion 11. The second elastic component 112 may be a spring. The second elastic component is disposed below the pressing body, and is compressed along with a pressing operation of the pressing body, so that the pressing component is capable of acting on the first transmission component and the first elastic component, thereby allowing the first transmission gear to detach from the control portion. The pressing component 110 further includes a protruding partition plate 114. The protruding partition plate 114 acts on the first transmission component 121, to realize that the first elastic component 122 is compressed and returns to its original shape. When the pressing body 111 is pressed by an external force, the pressing body 111 acts on the second elastic component 112, the second elastic component 112 acts on the first transmission component 121, and the first transmission component 121 acts on the first elastic component 122. The first elastic component 122 is compressed together with the first transmission component 121, and the first transmission gear 1212 is detached from the control portion 11. When the external force is withdrawn, the first elastic component 122 returns to its original state together with the first transmission component 121, and the first transmission gear 1212 is meshed with the control portion 11, which realizes that the pressing component 110 controls the connection state between the first transmission gear 1212 and the control portion 11.

Figure 5:
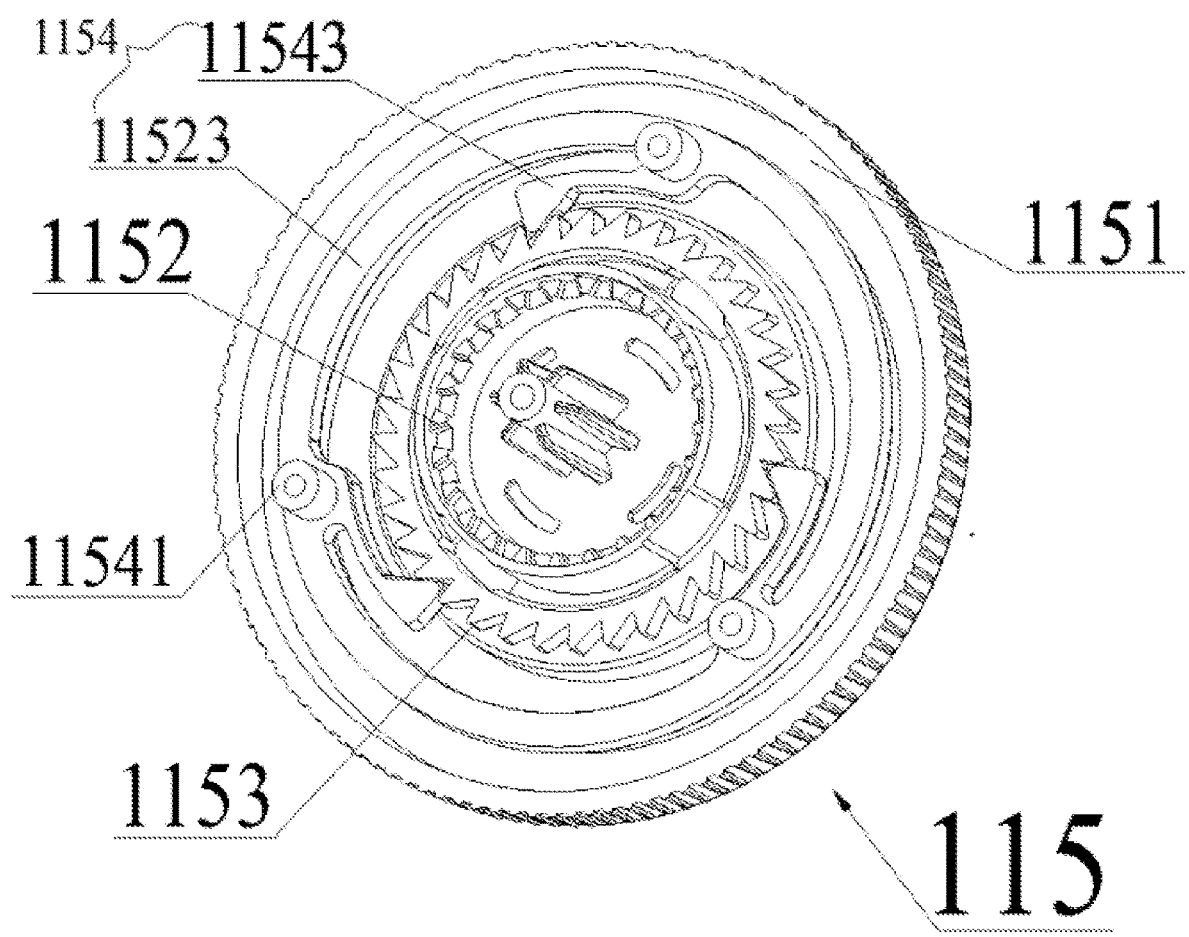
FIG. 5 is a structural schematic diagram of a rotating component in FIG. 4.
Figure 6:
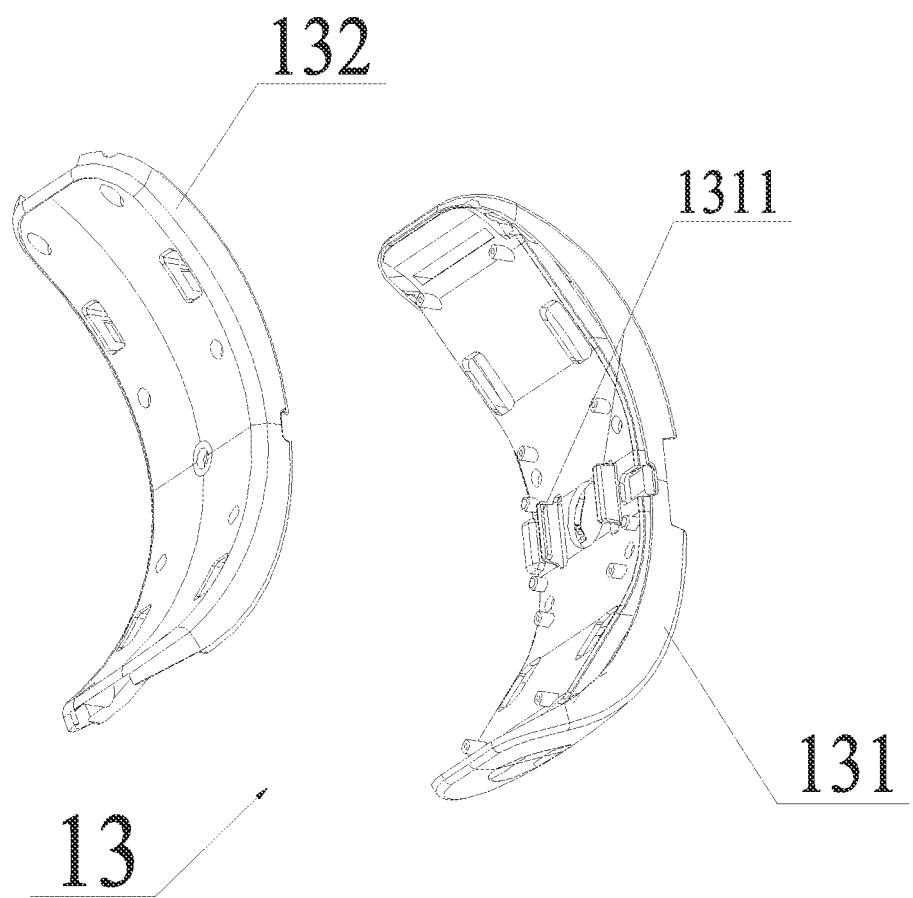
FIG. 6 is a structural schematic diagram of a housing in FIG. 2.
Figure 7:
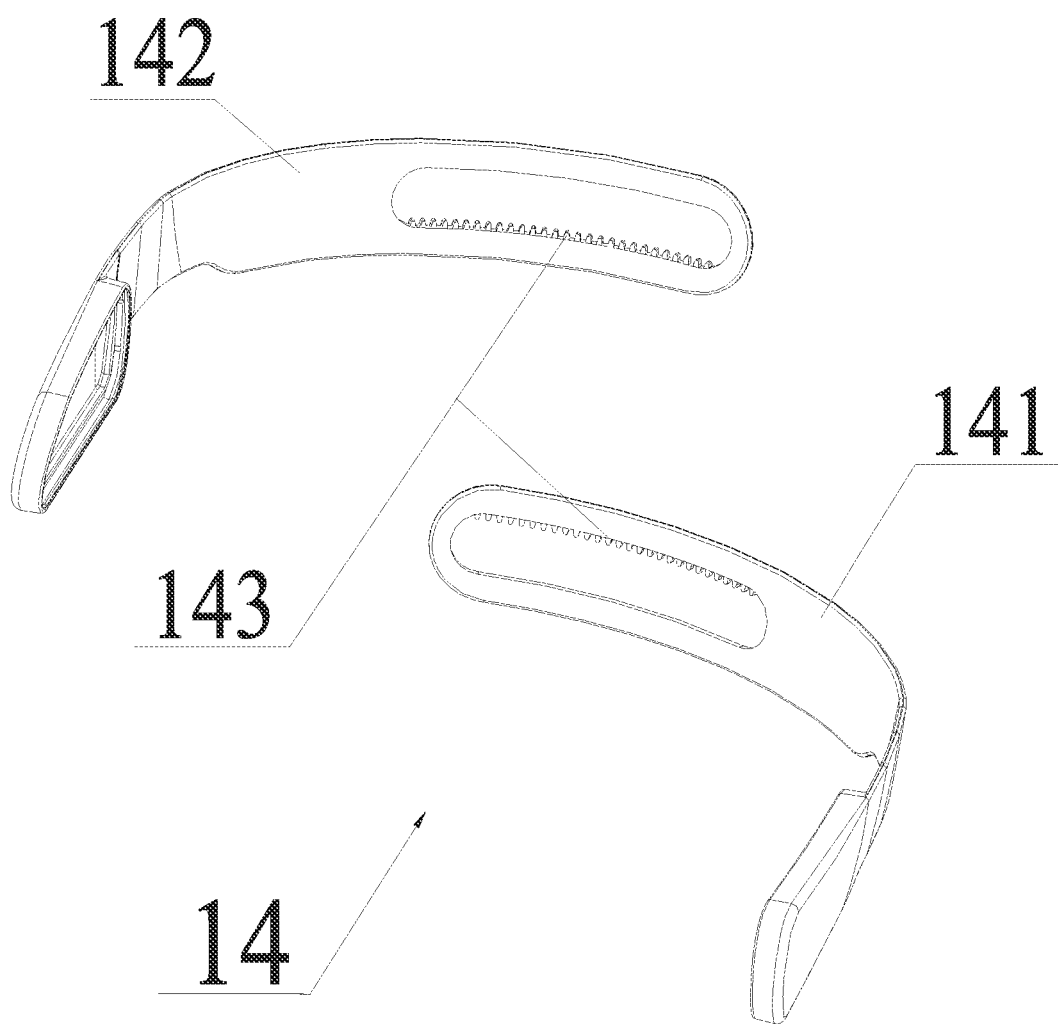
FIG. 7 is a structural schematic diagram of a telescoping band in FIG. 2.

Referring to FIG. 5, the rotating component 115 includes a rotating body 1151, an internal gear 1152, a ratchet wheel 1153, and a pawl ring 1154. The internal gear 1152 and the ratchet wheel 1153 are disposed on the rotating body 1151, the rotating body 1151 is fixed to the pressing component 110. The rotating body 1151 may drive the internal gear 1152 and the ratchet wheel 1153 to rotate. The internal gear 1152 is meshed with the first transmission gear 121. The pawl ring 1154 comprises a ring body 11542 and ring hooks 11543, a first end of each of the ring hooks 11543 is fixed to an inner surface of the ring body 11542, a second end of each of the ring hooks 11543 is spaced apart with the ring body 11542 and is capable of elastically deforming with respect to the ring body 11542, the pawl ring is fixed on the housing 13. The ratchet wheel 1153 is meshed with the pawl ring 1154, so that the rotating body 1151 can rotate in a single direction. The ring hooks 11543 and the ring body 11542 are integrally disposed. Fixing pillars 11541 are disposed on the pawl ring 1154, and are configured to fix the pawl ring 1154 on the housing 13. Each of the ring hooks 11543 comprises an end portion, a connecting portion, and a head portion; the end portion, the connecting portion, and the head portion are integrally disposed, a thickness of each connecting portion is less than a thickness of a corresponding end portion and a thickness of a corresponding head portion for deformation of each of the ring hooks 11543. Preferably, three ring hooks 11543 and three fixing pillars are provided, the three ring hooks 11543 are uniformly distributed, and the three fixing pillars are uniformly distributed. In a case that the rotating body 1151 drives the internal gear 1152 and the ratchet wheel 1153 to rotate in a direction that pawls on the pawl ring 1154 can move, the rotating body 1151 can rotate. In a case that the rotating body 1151 rotates in an opposite direction, the pawl ring 1154 fixing on the housing 13 constrain the rotation of the rotating body 1151, so that the rotating component 115 can rotate in a single direction, and is maintained stable Referring to FIG. 6, the housing 13 includes a first housing 131 and a second housing 132. A pair of position-limiting buckles 1311 is disposed on the first housing 131. The pair of position-limiting buckles 1311 is configured to fix the telescoping band 14. Referring to FIG. 7, the telescoping band 14 includes a first telescoping band 141 and a second telescoping band 142. The first telescoping band 141 and the second telescoping band 142 are identical in size and shape. Gear racks 143 are disposed on the first telescoping band 141 and the second telescoping band 142. The gear racks 143 are configured to mesh with the running gear 1232. The rotation of the running gear 1232 drives the gear racks 143 to move, so as to allow the first telescoping band 141 and the second telescoping band 142 to extend and retract. Ends of the first telescoping band 141 and the second telescoping band 142 having the gear racks 143 are located in the position-limiting buckles 1311, ensuring that the telescoping band 14 is not detached from the housing 13.

Figure 8:
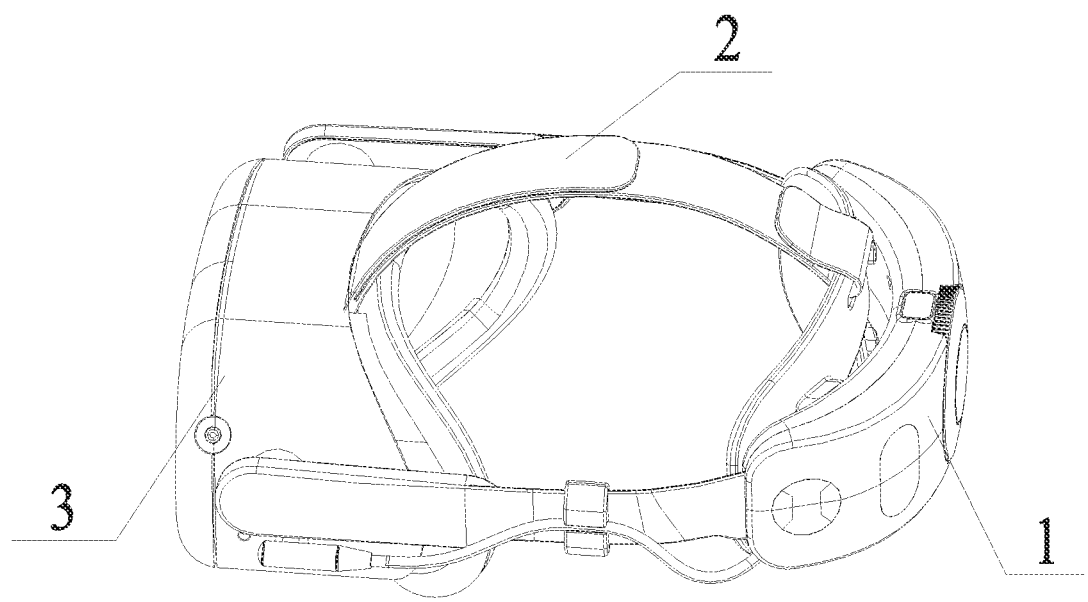
FIG. 8 is a structural schematic diagram of VR glasses according to the present disclosure.

Referring to FIG. 8, the adjustable headband 1 is applied to VR glasses provided by the present disclosure. The VR glasses further include a glasses body 3 and a fixing headband 2. Two ends of the adjustable headband 1 are connected to the glasses body 3. Two ends of the fixing headband 2 are respectively connected to the housing of the adjustable headband 1 and the glasses body 3. The adjustable headband 1 and the fixing headband 2 cooperate to tighten the VR glasses to the head portion of the users, so as to guarantee that the VR glasses are not detached from the users.

When using the VR glasses, the adjustable headband 1 is adjusted. In a case that there is a need to loosen the telescoping band 14 of the adjustable headband 1, an external force presses on the pressing body 111. The pressing body 111 acts on the second elastic component 112, so as to compress the second elastic component 112. The protruding partition plate 114 moves inwardly, to transmit the pressing force to the first transmission component 121. Under the action of the pressing force, the first transmission component 121 is compressed together with the first elastic component 122. The first transmission gear 1212 on the first transmission component 121 is detached from the internal gear 1152, so that the rotating component 115 loses control of the drive portion 12. The gear racks 143 on the telescoping band 14 are meshed with the running gear 1232. The drive portion 12 is in a free state, and the running gear 1232 is also in a free state. Accordingly, the gear racks 143 and the running gear 1232 operate freely. In this case, an external force is applied to the telescoping band 14, and the telescoping band 14 can freely extend and retract in a direction of the external force, thereby realizing the loosening of the telescoping band 14. In a case that there is a need to tighten the telescoping band 14, so as to rest the VR glasses firmly on the head portion of the users, it is guaranteed that no external force is applied to the pressing body 111, and the first transmission gear 1212 is meshed with the internal gear 1152. The rotating body 1151 on the rotating component 115 drives the internal gear 1152 and the ratchet wheel 1153 to rotate, and the internal gear 1152 drives the first transmission gear 1212 to operate. The first transmission gear 1212 and the transmission ring 1211 are coupling gears, and the second transmission gear 1231 and the running gear 1232 are coupling gears. The transmission ring 1211 and the second transmission gear 1231 are meshed with each other, and the gear racks 143 and the running gear 1232 are meshed with each other. In this way, the rotating body 1151 drives the internal gear 1152, so as to drive the gear racks 143, thereby adjusting the telescoping degree of the telescoping band 14. The rotating component 115 further includes the pawl rings 1154. The ratchet wheel 1153 is meshed with the pawl rings 1154, which allows the rotating body 1151 to rotate in a single direction. Thus, the rotating component 115 can only control the telescoping band 14 to perform the retraction operation. Besides, when there is no external force applied to the pressing body 111, the telescoping band 14 will not extend to cause the adjustable headband 1 to loosen, thereby keeping the VR glasses in position.

The above description is merely preferred embodiments of the present disclosure, which cannot be understood as a limitation to the scope of the present disclosure. Those skilled in the art can understand that all or part of the procedures for implementing the foregoing embodiments. Moreover, equivalent changes made in accordance with the claims of the present disclosure fall within the scope of the present disclosure.

What is claimed is:

1. An adjustable headband for virtual reality glasses, comprising:
 a housing;
 a telescoping band;
 a drive portion; and
 a control portion;
 wherein the housing is configured to fix and support the telescoping band, the drive portion and the control portion;

the telescoping band is configured to fix the virtual reality glasses to a head portion of a user;

the drive portion is configured to adjust a telescoping length of the telescoping band;

the control portion is configured to control the drive portion to operate;

the drive portion comprises a first transmission component, a first elastic component, and a second transmission component; the control portion is configured to drive the first transmission component; the first transmission component is configured to drive the second transmission component; the second transmission component is configured to drive the telescoping band; and the first elastic component is configured to control a drive connection between the first transmission component and the control portion;

the control portion comprises a pressing component and a rotating component, the pressing component is configured to control a connection state between the first transmission gear and the control portion, and the rotating component is configured to drive the first transmission gear to rotate;

the rotating component comprises a rotating body, an internal gear, a ratchet wheel, and a pawl ring; the internal gear and the ratchet wheel are disposed on the rotating body, the rotating body is fixed to the pressing component, the rotating body is configured to drive the internal gear and the ratchet wheel to rotate;

the internal gear is meshed with the first transmission gear;

the pawl ring comprises a ring body and ring hooks, a first end of each of the ring hooks is fixed to an inner surface of the ring body, a second end of each of the ring hooks is spaced apart with the ring body and is capable of elastically deforming with respect to the ring body, the pawl ring is fixed on the housing; and the ratchet wheel is meshed with the pawl ring, to allow the rotating body to rotate in a single direction.

2. The adjustable headband for virtual reality glasses according to claim 1, wherein the first transmission component comprises a transmission ring and a first transmission gear; the transmission ring and the first transmission gear are first coupling gears; the second transmission component comprises a second transmission gear and a running gear; the second transmission gear and the running gear are second coupling gears; the first transmission gear is meshed with the control portion; the transmission ring is meshed with the second transmission gear; and the running gear is meshed with the telescoping band.

3. The adjustable headband for virtual reality glasses according to claim 1, wherein the pressing component comprises a pressing body, a plurality of snap-fit hooks, and a second elastic component; the plurality of the snap-fit hooks are configured to guarantee that the pressing body is not detached from the control portion; and the second elastic component is disposed below the pressing body, and the second elastic component is compressed with a pressing operation of the pressing body, so that the pressing component is capable of acting on the first transmission component and the first elastic component, to allow the first transmission gear to detach from the control portion.

4. The adjustable headband for virtual reality glasses according to claim 1, wherein a non-slip thread is disposed on an outer side wall of the rotating body.

5. The adjustable headband for virtual reality glasses according to claim 1, wherein the housing comprises a first housing and a second housing; a pair of position-limiting buckles are disposed on the first housing, and the pair of the position-limiting buckles are configured to fix the telescoping band.

6. The adjustable headband for virtual reality glasses according to claim 1, wherein the telescoping band comprises a first telescoping band, and a second telescoping band; the first telescoping band and the second telescoping band are identical in size and shape.

7. The adjustable headband for virtual reality glasses according to claim 6, wherein gear racks are disposed on the first telescoping band and the second telescoping band, the gear racks are configured to mesh with a running gear, and the running gear rotates to drive the gear racks to move, so as to allow the first telescoping band and the second telescoping band to extend and retract.

8. Virtual reality glasses, comprising:
a glasses body;
a fixing headband; and
the adjustable headband according to claim 1;
wherein two ends of the adjustable headband are connected to the glasses body; and two ends of the fixing headband are respectively connected to the housing of the adjustable headband and the glasses body.

9. The adjustable headband for virtual reality glasses according to claim 1, wherein the ring hooks and the ring body are integrally disposed.

10. The adjustable headband for virtual reality glasses according to claim 1, wherein fixing pillars are disposed on the pawl ring, and each fixing pillar is disposed at a connection position of a corresponding one of the ring hooks and the ring body.

11. The adjustable headband for virtual reality glasses according to claim 10, wherein three fixing pillars are provided, and the three fixing pillars are uniformly distributed.

12. The adjustable headband for virtual reality glasses according to claim 1, wherein each of the ring hooks comprises an end portion, a connecting portion, and a head portion; the end portion, the connecting portion, and the head portion are integrally disposed, a thickness of each connecting portion is less than a thickness of a corresponding end portion and a thickness of a corresponding head portion for deformation of each of the ring hooks.

13. The adjustable headband for virtual reality glasses according to claim 1, wherein three ring hooks are provided, and the three ring hooks are uniformly distributed.

* * * * *